Aug. 3, 1943.   F. J. KRABER   2,325,779
JUICE EXTRACTOR
Filed July 28, 1941
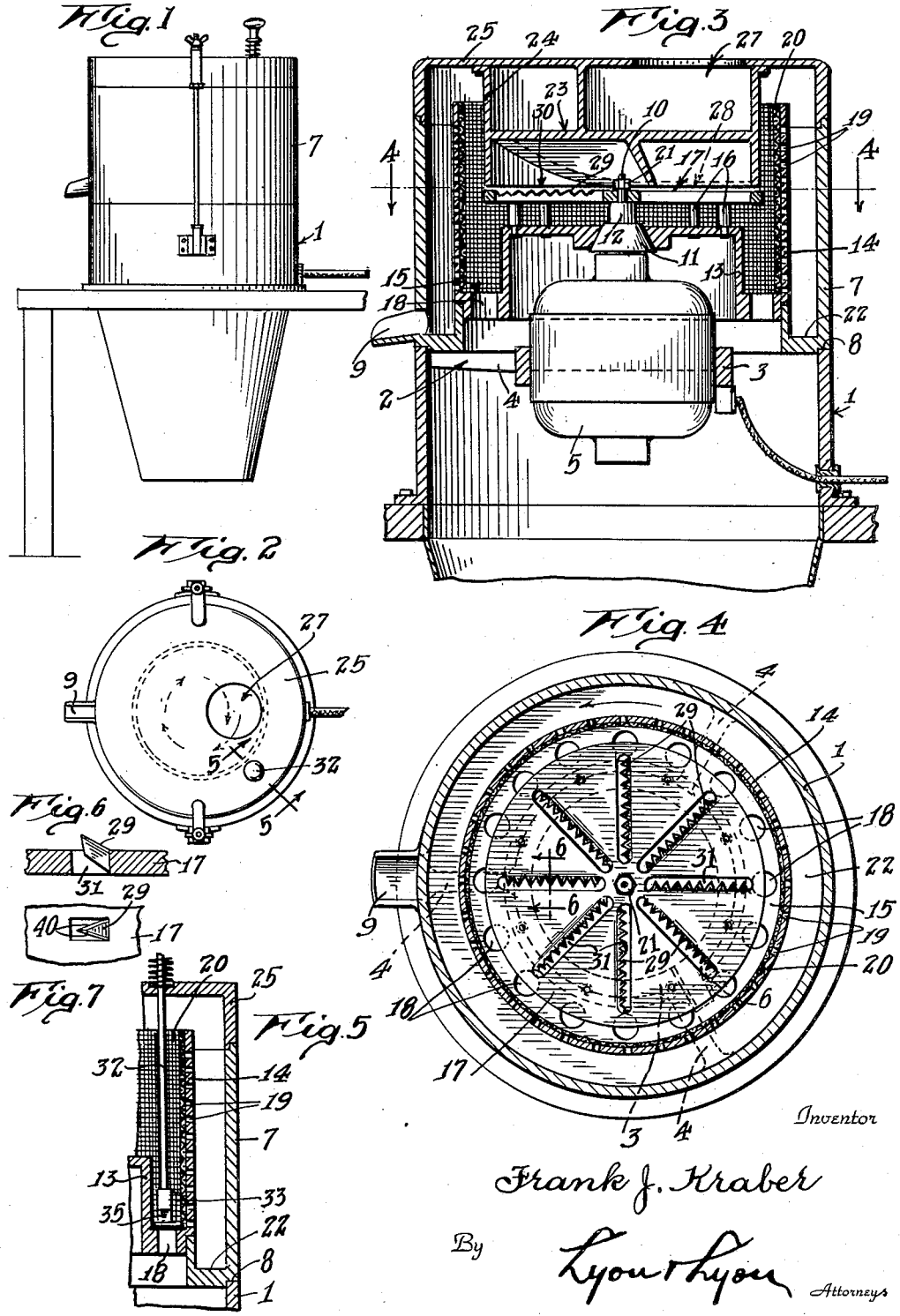
Inventor
Frank J. Kraber
By Lyon & Lyon
Attorneys Patented Aug. 3, 1943

2,325,779

UNITED STATES PATENT OFFICE 2,325,779

JUICE EXTRACTOR

Frank J. Kraber, Los Angeles, Calif.

Application July 28, 1941, Serial No. 404,341

5 Claims. (Cl. 146—76)

My invention relates to juice extractors and more particularly to a juice extractor with an automatic feed and a centrifugal strainer.

In extracting the juice from vegetables and fruit, it has been found that the extracted juice must be quickly canned or bottled, or oxidation sets in, which destroys the taste and flavor when canned or bottled. It is believed that this oxidation is due to the large amount of air minutely forced into the pulp during the shredding of the vegetables and fruit and that immediate separation of the juice and pulp is necessary to prevent this oxidation.

My invention has a spiral feed or hopper into which the fruit or vegetables can be placed and, because of the nature of the shredding knife and its related position to the output of the spiral hopper, the fruit or vegetables are shredded upon the contact of the material and the knife. In connection with this knife is a centrifugal strainer which strains the shredded pulp and the juice as the knife operates. There is no lost time or motion. A carrot, for example, can be run through my strainer and the pulp-free juice emerges from the outlet almost simultaneously with the arrival of the carrot at the shredding knife, and the juice can be immediately canned or bottled.

As all strainers have a tendency to clog because of deposits of shredded pulp, I have devised a cleaner which does not necessitate the stopping of my extractor, which will keep the strainer clean and not interrupt the operation of extracting juice.

It is, therefore, an object of my invention to provide an automatically fed juice extractor.

Another object of my invention is to provide a juice extractor which finely shreds the pulp and immediately separates the juice therefrom.

Another object of my invention is to provide a juice extractor in which the particular shape of the shredding knife cooperates with the feed device to force vegetables and fruit through the shredding knife.

Another object of my invention is to provide a combination of feed, shredding knife and centrifugal strainer, which substantially instantaneously shreds and strains materials fed into it.

Another object of my invention is to provide means for keeping the centrifugal strainer clean and removing the separated pulp therefrom.

Other objects and advantages of my juice extractor will be apparent from the following description of the preferred embodiment of my invention.

In the drawing:

Fig. 1 is an elevation of my juice extractor.

Fig. 2 is a plan view of my juice extractor.

Fig. 3 is a cross section of my juice extractor.

Fig. 4 is a section taken on line 4—4 of Fig. 3.

Fig. 5 is a cross section taken on the line 5—5 of Fig. 2.

Fig. 6 is a cross section taken on the line 6—6 of Fig. 4.

Fig. 7 is a fragmentary plan view looking at the bottom of Fig. 6.

A juice extractor constructed in accordance with my invention has an outer shell 1 cast with the integral web 2 for a motor mount. The web 2 comprises the split ring 3 and the three arms 4. An electric motor 5 is inserted in the split ring 3 and held tightly in position by the bolt 6.

The casing 7 seats on the shoulder 8 of the shell 1 and encloses the centrifugal strainer and shredding knife and has a trough 22 for the reception of the pulp-free juice after passing through the centrifugal strainer. A spout 9 permits the outflow of the juice for canning, etc.

The shaft 10 of the motor 5 has a truncated cone 11 forced thereon to form a support for the web 13 which supports the outer strainer 14. The web 13 comprises a casting having a tight fit on truncated cone 11 and has riveted thereto spacers 16 for preventing sagging and distortion of the shredding knife 17. Extending down from the web 13 is a trough 15 which comprises a space for the collection of the pulp. I provide the holes 18 all around the trough to permit the escape of the pulp which passes through these holes 18 and down through the bottom of the shell 1.

The outer strainer 14 can be a separate circular strainer bolted to the web 13, or, as in my preferred form, an integral casting with the web 13. This strainer 14 has the holes 19 for the outflow of the juice and because of its rigidity forms a firm base for the fine mesh strainer 20 which is made of wire mesh and held against the strainer by the natural spring of its material and by the centrifugal force of its rotation.

The shredding knife 17 is bolted into fixed position on the motor shaft 10 by the nut 21 and also rests on the spacers 12 and 16 for rigidity. However, the spacers 16 are not necessary and are used only for added strength in this preferred form of my invention.

To positively force vegetables and fruit through the shredding knife 17, I provide a spiral passage 23 comprising a casting 24 bolted to an outer casing 25, which casing 25 seats on the casing 7. The spiral passage 23 has an outer opening 27 into which the vegetables are placed and are allowed to fall by gravity down the spiral passage 23 into contact with the shredding knife 17 at the outlet 28.

The shredding knife 17 comprises a disc into which the teeth 29 and the openings 31 have been either sawed or stamped. The teeth 29 are upstruck as shown in Fig. 6 so as to grip the vegetables at the same time that they are shredded. The upstruck teeth 29 cooperate with the bottom surface 30 of the casting 24 so as to shred the vegetables. By bevelling the underside of the teeth 29 with the bevels 40 as shown in Fig. 7, the efficiency of the shredding knife is increased. The bevels 40, by decreasing the size of the teeth on their underside, aid in the hurling of the shredded material through the openings 31 and against the centrifugal strainers 14 and 20.

The gap between the upper point of the teeth 29 and the bottom surface 30 is kept to a minimum clearance and in the test machine of this invention even operated when slight contact was made therebetween.

In the operation of my invention, rotation of the motor shaft 10 by the motor 5 rotates the shredding knife 17 and when vegetables or fruit are fed into the spiral passage 23 they fall by gravity into contact with the rotating shredding knife 17 and are shredded by the teeth 29 forced by the bottom surface 30 of the casting 24 through the openings 31 in the plate of the shredding knife 17 and hurled by centrifugal force against the strainer 20 where the juice passes through the openings therethrough and through the holes 19 in the outer strainer 14 into the trough 22 from where said juice is drawn off through the spout 9. As the strainers 14 and 20 are both carried and rotated by the motor shaft 10, the centrifugal force imparted by this rotation quickly separates the juice and pulp and the pulp falls out of the machine through the holes 18.

One of the principal features of my invention is that the upstruck teeth 29 of the shredding knife bite into the vegetables and fruit and immediately shred the same and hurl the shredded pulp and juice through the openings 31 at the centrifugal strainers and thus they are shredded and strained almost simultaneously and there is no chance for oxidation.

I have found that the spiral passage 23 is the only type of feed mechanism which will cause the automatic feeding of my invention and that a straight hopper as a feed necessitates some means for ramming down the vegetables and maintaining them in contact with the shredding knife. The reason for the efficiency of the spiral passage 23 is that the shredding knife 17 rotates in the same direction as the downward spiral of the spiral passage and the vegetables are forced by the teeth 29 into contact with the roof of the spiral passage 23 which extends downwardly almost into contact with the shredding knife 17. As the teeth 29 shred the vegetable, it is continually forced along this roof and thus forced against the shredding knife.

I have found that all centrifugal strainers of this type have a tendency to pulp-up; i. e., the juice-free pulp tends to cling to the strainer and impair its efficiency. I have therefore incorporated a strainer cleaner to prevent any possible slowing up of the shredding and straining out of the juice which might allow oxidation. This cleaner comprises a plunger 32 slidably journaled in the casing 25 and having a scraper 33 fastened to its bottom. The journal of the plunger is positioned in the casing 25 at a point where the scraper 33 just clears the inner side of the strainer 20. By raising and lowering the plunger 32 when the strainer is in rotation, the scraper will free any pulp clinging to the strainer 20 and allow it to drop through the holes 18. In case the holes 18 become clogged, the plunger 32 is of such length that the scraper 33 can be lowered substantially into contact with the upper surface of the trough 15 and the downwardly sloping surface 35 of the scraper 33 forces the pulp out through the holes 18.

While I have described the preferred embodiment of my invention, I am not limited thereby, except as specified in the appended claims.

I claim:

1. In a juice extractor, a rotary shredding knife having a plurality of upstruck teeth, a passage through said knife adjacent to said teeth, a centrifugal strainer, a spiral feed for feeding vegetables to said knife, said spiral feed having an exterior surface adjacent to said knife and positioned with a minimum of clearance between it and said shredding knife whereby said upstruck teeth and said surface cooperate with each other to shred said vegetables and hurl said shredded vegetables through said knife against said centrifugal strainer.

2. In a juice extractor, a rotary shredding knife having a plurality of upstruck teeth, a passage through said knife adjacent to said teeth, a centrifugal strainer, a spiral feed for feeding vegetables to said knife, said spiral feed having an exterior surface adjacent to said knife and positioned with a minimum of clearance between it and said shredding knife whereby said upstruck teeth and said surface cooperate with each other to shred said vegetables and hurl said shredded vegetables through said knife against said centrifugal strainer, and said upstruck teeth being beveled on their undersides to increase the efficiency of said shredding knife.

3. In a juice extractor, a rotary shredding knife, a centrifugal strainer, a spiral feed substantially contacting said knife for feeding vegetables to said shredding knife and cooperating with said shredding knife to shred said vegetables and hurl said shredded vegetables through openings in said knife against said centrifugal strainer.

4. In a juice extractor, a rotary shredding knife having a plurality of upstruck teeth, a centrifugal strainer, a spiral feed substantially contacting said knife for feeding vegetables to said shredding knife and cooperating with said shredding knife to shred said vegetables and hurl said shredded vegetables through openings in said knife against said centrifugal strainer.

5. In a juice extractor, a rotary shredding knife having a plurality of upstruck teeth, a centrifugal strainer, a spiral feed substantially contacting said knife for feeding vegetables to said shredding knife and cooperating with said shredding knife to shred said vegetables and hurl said shredded vegetables through openings in said knife against said centrifugal strainer, and said upstruck teeth being beveled on their undersides to increase the efficiency of said shredding knife.

FRANK J. KRABER.